United States Patent [19]

Dolezal et al.

[11] Patent Number: 5,243,618
[45] Date of Patent: Sep. 7, 1993

[54] CAVITY RESONATOR INCORPORATING WAVEGUIDE FILTER

[75] Inventors: Franklin A. Dolezal, Reseda; Daniel J. Gregoire; Robin J. Harvey, both of Thousand Oaks, all of Calif.

[73] Assignee: Hughes Aircraft Company, Los Angeles, Calif.

[21] Appl. No.: 796,153

[22] Filed: Nov. 22, 1991

[51] Int. Cl.$^5$ .............................. G02B 6/20
[52] U.S. Cl. .......................... 372/92; 372/2; 385/125
[58] Field of Search ............... 372/2, 64, 92; 385/125

[56] References Cited

U.S. PATENT DOCUMENTS

| | | | |
|---|---|---|---|
| 3,583,786 | 6/1971 | Marcatili | 385/125 |
| 4,057,772 | 11/1977 | Basil et al. | 333/83 T |
| 4,438,513 | 3/1984 | Elias et al. | 372/2 |
| 4,688,892 | 8/1987 | Laakmann | 385/125 |
| 4,688,893 | 8/1987 | Laakmann | 385/125 |
| 4,697,272 | 9/1987 | Harvey | 372/99 |
| 4,806,289 | 2/1989 | Laursen et al. | 385/125 X |
| 4,930,863 | 6/1990 | Croitoriu et al. | 385/125 |
| 5,005,944 | 4/1991 | Laakmann et al. | 385/125 |

FOREIGN PATENT DOCUMENTS 2445047 7/1980 France .

OTHER PUBLICATIONS

"The New UCSB Compact Far-Infrared Fel", G. Ramian et al., Nuclear Instruments & Methods in Physics Research, Section A: Accelerators, Spectrometers, Detectors and Associated Equipment, vol. 272, No. ½, Feb. 1988, Amsterdam NL, pp. 81–88.
"Classical Electrodynamics" by D. J. Jackson, John Wiley and Sons, 1975, 2nd Edition, pp. 335–339.

Primary Examiner—Akm E. Ullah
Attorney, Agent, or Firm—V. D. Duraiswamy; W. K. Denson-Low

[57] ABSTRACT

A waveguide filter (22,24) is incorporated into a cavity resonator (20) for a free-electron laser or the like by coating a material layer (24) on the inner peripheral surface of a hollow waveguide member (22). A high pass filter configuration is provided when the conductivity of the material layer (24) is higher than that of the waveguide member (22), such that electromagnetic signals having wavelengths longer than the skin depth of the material layer (24) pass into and are affected by the lower conductivity waveguide member (22). Reversing the conductivities produces a low pass filter configuration in which signals having wavelengths shorter than the skin depth are affected by the material layer (24). A bandpass filter configuration is provided by adding an additional material layer (32) of low conductivity to a high pass filter, whereas a band exclusion filter configuration is produced by adding an additional material layer (32) of high conductivity to a low pass filter.

24 Claims, 4 Drawing Sheets

CAVITY RESONATOR INCORPORATING WAVEGUIDE FILTER

BACKGROUND OF THE INVENTION

1. Field of the Invention

The present invention generally relates to the field of high frequency waveguide devices, and more specifically to a cavity resonator incorporating a waveguide filter which may be advantageously employed in a free-electron laser.

2. Description of the Related Art

In a free-electron laser (FEL) such as disclosed in U.S. Pat. No. 4,438,513, entitled "SHORT WAVELENGTH FREE ELECTRON LASER USING LOW ENERGY ELECTRONS", issued Mar. 20, 1984 to L. Elias et al, an electron beam interacts with a magnetic "wiggler" field to produce coherent radiation at microwave or optical frequencies. The interaction region is enclosed in a cavity resonator which includes a hollow waveguide member provided with reflectors at its opposite ends to create resonance at the frequency of the microwave or optical radiation, and thereby enhancing gain and stimulated emission.

The reflectors may be optical mirrors or microwave reflectors, or blazed corrugations or vanes which satisfy the Bragg conditions for gratings such as disclosed in U.S. Pat. No. 4,697,272, entitled "CORRUGATED REFLECTOR APPARATUS AND METHOD FOR FREE ELECTRON LASERS", issued Sep. 29, 1987 to R. Harvey.

A typical FEL has a dispersion curve as illustrated in FIG. 1. For a given waveguide mode and voltage applied to electrostatically accelerate the electron beam, a conventional cavity resonator will produce gain at two discrete frequencies such as designated at 10 and 12 in the drawing. The higher frequency 10, which is the desired microwave or optical emission frequency of the laser and is approximately 30 GHz in the illustrated example, corresponds to the forward propagation mode, whereas the lower, undesired frequency 12 is approximately 10 GHz and corresponds to the backward propagation mode.

Conventional cavity resonators can be designed to have a high quality factor, Q, for the high frequency mode. However, if the low frequency mode is near the waveguide cutoff frequency of the waveguide member, the Q for the low frequency mode will also be high, and the two modes can compete with each other. When this happens, the gain of the desired high frequency mode is degraded.

Suppression of undesired frequency modes in waveguide structures such as cavity resonators has been accomplished in the past by providing tuned structures inside the waveguides which pass signals only in selected frequency ranges. The theory and design of conventional waveguide filters is described in detail in a textbook entitled "MICROWAVE TRANSMISSION CIRCUITS", edited by G. Ragan, McGraw-Hill 1948, pp. 540–716. However, these filters are often inappropriate for use in a cavity resonator of an FEL because they have unacceptably narrow bands of operation.

SUMMARY OF THE INVENTION

The present invention provides a waveguide filter, and a cavity resonator incorporating the filter, which may be advantageously employed in a free-electron laser, traveling-wave tube, plasma-wave tube, pasotron or other microwave or optical device which requires frequency selectivity.

The present structure includes a material layer coated on the inner peripheral surface of a waveguide member. A high pass filter is provided when the conductivity of the material layer is higher than that of the waveguide member, such that electromagnetic signals having wavelengths longer than the skin depth of the material layer pass into and are absorbed by the lower conductivity waveguide member. Reversing the conductivities produces a low pass filter in which signals having wavelengths shorter than the skin depth are absorbed by the material layer. A bandpass filter is provided by adding an additional material layer of low conductivity to a high pass filter, whereas a band exclusion filter is produced by adding an additional material layer of high conductivity to a low pass filter.

These and other features and advantages of the present invention will be apparent to those skilled in the art from the following detailed description, taken together with the accompanying drawings, in which like reference numerals refer to like parts.

DETAILED DESCRIPTION OF THE INVENTION

As described, for example, in a textbook entitled "Classical Electrodynamics" by J. D. Jackson, John Wiley and Sons, 1975, pp. 335–339, the power loss per unit area of an electromagnetic wave having frequency f, incident on a material with conductivity $\sigma$ and permeability $\mu$, is dependent on $\sigma, \mu$ and f as $$\frac{dP_{loss}}{da} \sim \sqrt{\frac{\mu f}{\sigma}} \tag{1}$$

It is evident that the ohmic losses in the conductor increase with decreasing conductivity. It is important to note that the losses occur due to current flow in a volume near the conductor surface defined by the skin depth $\delta$, $$\delta = \sqrt{\frac{2}{\omega \sigma \mu}} = \frac{504}{\sqrt{f \sigma K_m}} \tag{2}$$

where $\omega = 2\pi f$, $K_m$ is the material's relative permeability having the value $K_m = \mu/\mu_o$, and $\mu_o$ is vacuum permeability.

Equations (1) and (2) illustrate the two physical characteristics which are crucial to our invention.

1) The ohmic losses increase with decreasing conductivity.

2) The skin depth decreases with increasing frequency. These properties are also applicable to electromagnetic radiation propagating in a waveguide composed of conductive material.

By utilizing the concepts of frequency and conductivity dependent loss and skin depth, waveguides may be internally coated with thin layers of different conductivity materials to alter the loss of a wave propagating through such a waveguide. If a layer of material is placed over a substrate, or waveguide, the thickness of which is less than one skin depth at a particular frequency, then the losses corresponding to that of the substrate or waveguide affect the radiation and modify the loss relative to that of an infinite thickness of the layered material.

Figure 2:
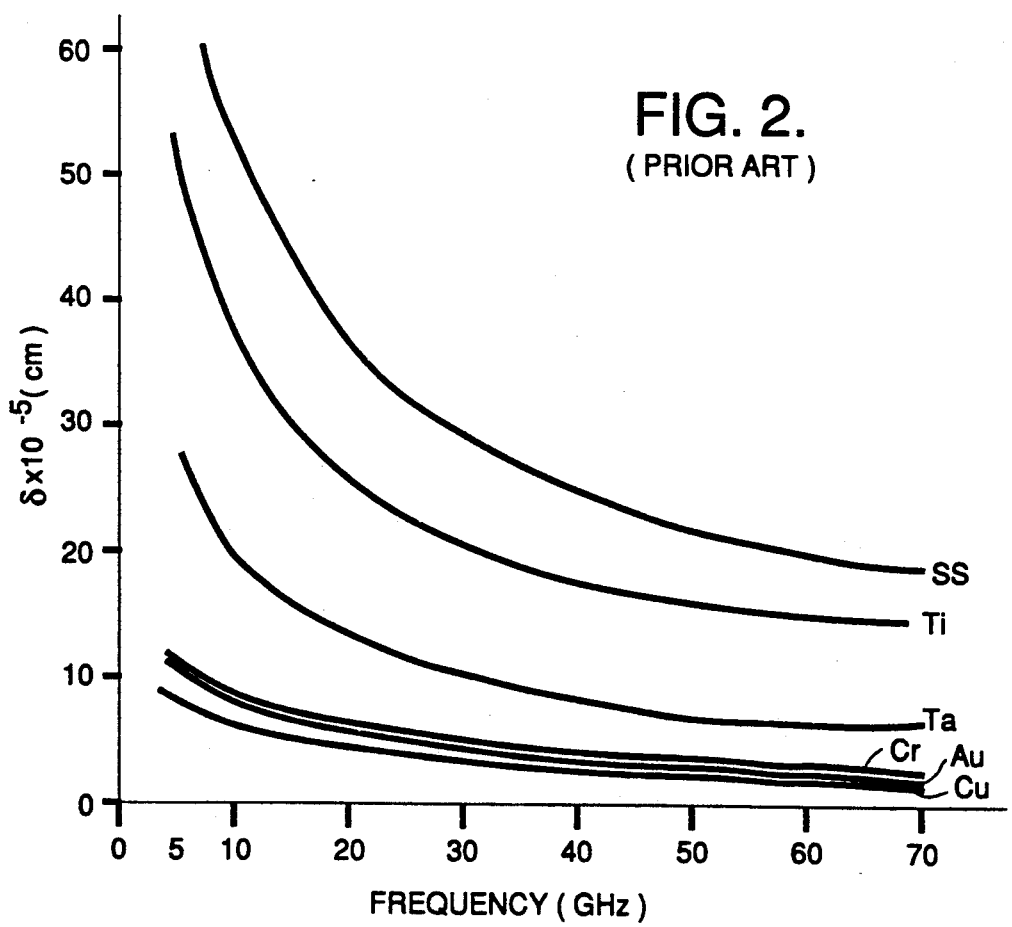
FIG. 2 is a graph illustrating the skin depth as a function of frequency for several materials.

The skin depth $\delta$ as a function of frequency f is illustrated in FIG. 2 for several exemplary materials which may be used to practice the invention, more specifically stainless steel (SS), titanium (Ti), tantalum (Ta), chromium (Cr), gold (Au) and copper (Cu).

Figure 3:
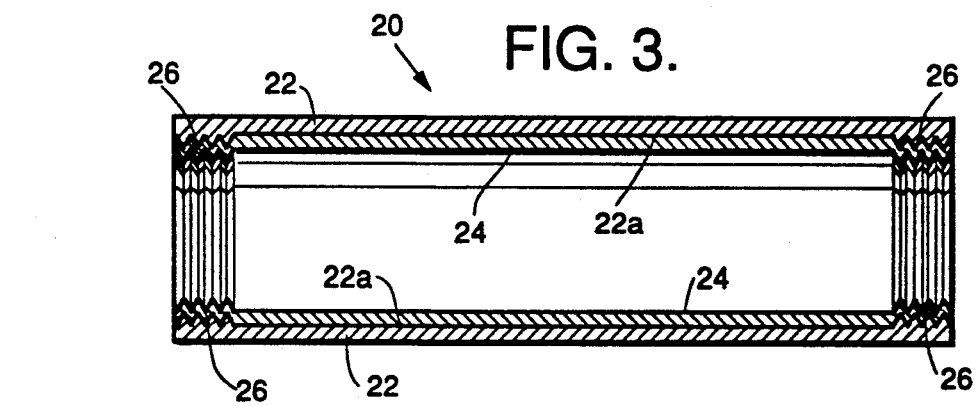
FIG. 3 is a longitudinal sectional view of a cavity resonator incorporating a waveguide filter embodying the present invention.

Referring now to FIG. 3, a cavity resonator for an FEL or the like is generally designated as 20, and includes a hollow waveguide member 22. A layer 24 of a material having an electrical conductivity which is different from the conductivity of the material of the waveguide member 22 is coated on an inner peripheral surface 22a of the member 22. The waveguide member 22 may have a hollow circular, rectangular or other suitable cross section within the scope of the invention. It is preferred that the surface 22a of the waveguide member 22 and the surface of the material 24 be optically smooth, with spatial variations being substantially smaller than one wavelength within the operating frequency range of the resonator 20. More specifically, the spatial variations should be much smaller than $0.25c/f_H$, where c is the speed of light and $f_H$ is the highest frequency of operation.

The resonator 20 further includes reflectors for producing resonance of electromagnetic radiation at a microwave or optical emission frequency in the waveguide member 22. As illustrated, this function may be achieved by providing internal blazed corrugations or vanes 26 which satisfy the Bragg conditions for gratings at the opposite ends of the waveguide member 22 such as described in the above referenced patent to Harvey.

Alternatively, although not shown, the corrugations 26 may be replaced by optical mirrors or microwave reflectors. It is further within the scope of the invention to omit the reflectors, and utilize the resonator as a frequency selective waveguide filter in an apparatus other than an FEL. Where reflectors such as the corrugations 26 are provided, the material layer 24 may be coated on the corrugations 26 as illustrated, or may be coated only on the portion of the inner surface 22a of the waveguide member 22 between the corrugations 26.

Figure 1:
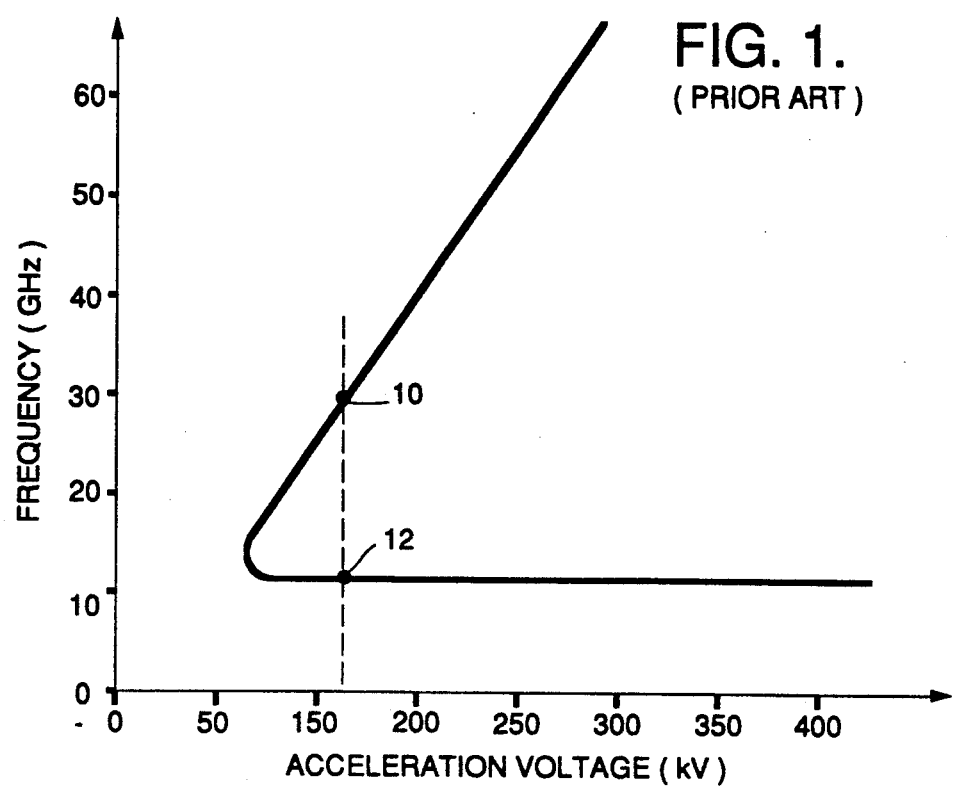
FIG. 1 is a graph illustrating the dispersion curve of a conventional free-electron laser.

As discussed above with reference to FIG. 1, where the resonator 20 is employed in an FEL, it is desired to maximize the Q of the resonator 20 for the high frequency mode, and suppress or attenuate the low frequency mode. This may be accomplished in accordance with the present invention by configuring the resonator 20 to operate as a high pass filter, with the conductivity of the material layer 24 being higher than the conductivity of the waveguide member 22. For example, the waveguide member 22 may be made of stainless steel having a conductivity of $1.4 \times 10^6$ mhos/meter, whereas the material layer 24 may be formed of copper having a conductivity of $5.8 \times 10^7$ mhos/meter. The relative permeability $K_m$ of these materials is substantially unity.

The amplitude loss, or percentage of radiation absorbed by the resonator 20 at a specified frequency f, is equal to $1-R$, where R is the net percentage of radiation reflected from the inner peripheral surface of the material layer 4, and $$R = \left(\frac{ik - \beta}{ik + \beta}\right)^2 \tag{3}$$

$$i = \sqrt{-1}$$

$\beta$ is a loss coefficient having the value $$\beta = (i-1)\frac{[1 - \alpha e^{2(i-1)\Gamma_1 a}]}{[1 + \alpha e^{2(i-1)\Gamma_1 a}]} \Gamma_1$$

$$\alpha = \frac{\Gamma_1 - \Gamma_2}{\Gamma_1 + \Gamma_2}$$

k is the wave number (reciprocal of the frequency f) of the radiation, $\Gamma_1$ is the reciprocal of the skin depth $\delta_1$ of the material layer 24, $\Gamma_2$ is the reciprocal of the skin depth $\delta_z$ of the waveguide member 22, and a is the thickness of the material layer 24. Although the reflectance R further varies as a function of the angle of incidence of the radiation, in most practical applications the radiation is substantially normal to the surface 22a, and equ (3) provides a reasonably accurate approximation of the reflectance R.

Figure 4:
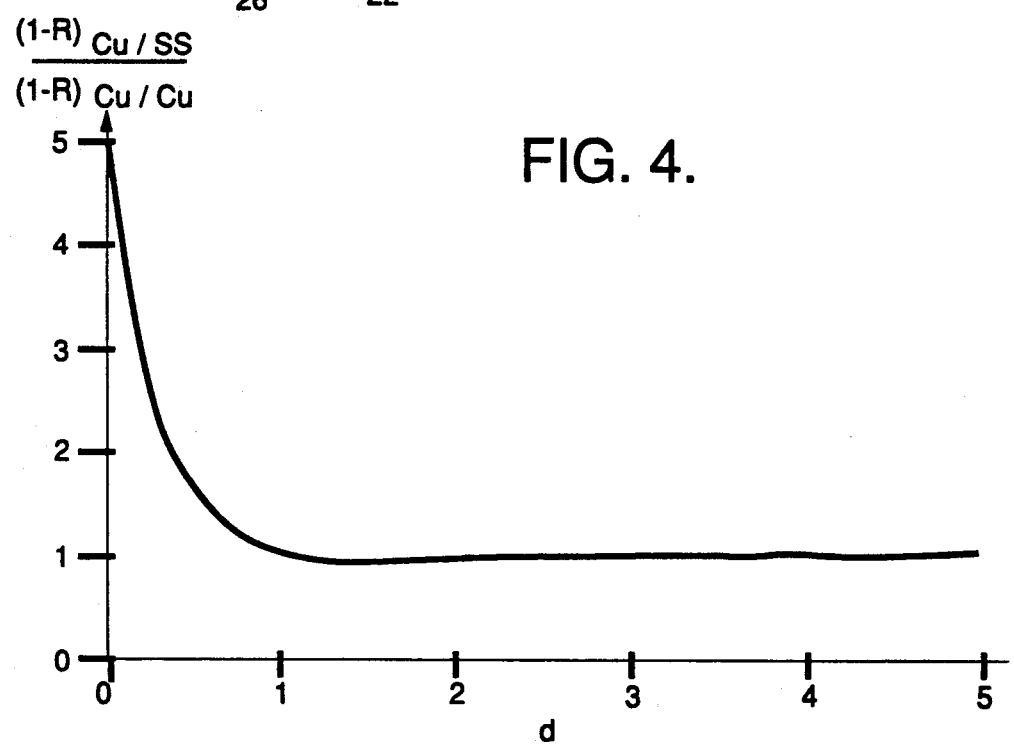
FIG. 4 is a graph illustrating the operation of the cavity resonator of FIG. 3 in a high pass filter configuration.

This relation is plotted for the high pass filter case in FIG. 4, which illustrates the amplitude loss $(1-R)$ in the resonator 20 represented by the vertical axis as the ratio of the loss for a copper layer 24 on a stainless steel waveguide member 22 relative to the loss for a copper waveguide member 22 alone. In the high pass filter case, the conductivity $\sigma_1$ of the material layer 24 is higher than the conductivity $\sigma_1$ of the material layer 24 is higher than the conductivity $\sigma_2$ of the waveguide member 22. The thickness of the member 22 is assumed to be infinite for the purpose of the present approximation. The variable $d = a/\delta$ represented by the horizontal axis is a, the thickness of the layer measured in skin depths $\delta_1$ of the material layer 24. Since the skin depth $\delta_1$ is inversely proportional to the square root of the frequency $1/f^{\frac{1}{2}}$, the horizontal axis may also be interpreted as representing increasing frequency.

As viewed in the drawing, the loss is high for values of d smaller than unity, and decreases to a limiting value for values of d above approximately 1.3. The lower limiting value is equal to the loss in pure copper. This is because electromagnetic radiation at a relatively high frequency with a corresponding wavelength shorter than approximately the skin depth $\delta_1$ of the material layer 24 does not pass through the layer 24, and is affected only by the higher conductivity layer 24. However, a portion of electromagnetic radiation at a relatively low frequency with a corresponding wavelength longer than the skin depth $\delta_1$ of the material layer 24 passes through the material layer 24 into the lower conductivity waveguide member 22 and is affected by the lower conductivity material of the waveguide member 22.

In summary, the high pass filter configuration provides relatively low absorption or loss above a frequency at which the skin depth $\delta_1$ in the material layer 24 is approximately equal to the thickness a of the layer 24, and progressively increasing relative absorption or loss as the frequency is decreased.

Figure 5:
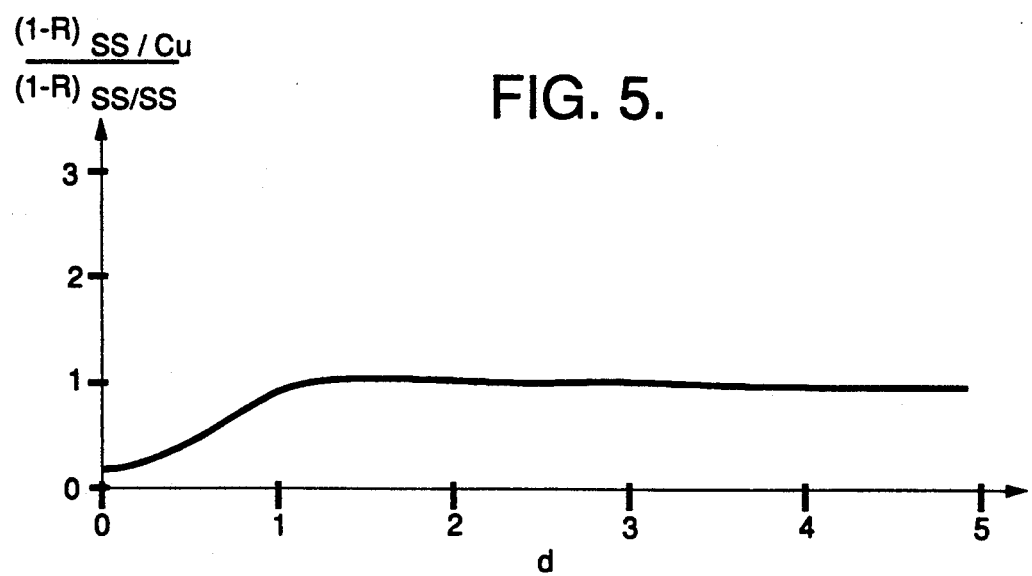
FIG. 5 is a graph illustrating the operation of the cavity resonator of FIG. 3 in a low pass filter configuration.

The embodiment of the resonator 20 configured to operate as a low pass filter is illustrated in FIG. 5, in which the material layer 24 is formed of stainless steel having a conductivity $\sigma_1$ which is lower than the conductivity $\sigma_2$ of the waveguide member 22 which is made of copper. In other words, the relative conductivities of the material layer 24 and waveguide member are reversed from those of the high pass filter configuration.

The loss of the low pass filter relative to the case of a stainless steel member 22 alone is illustrated in FIG. 5. It will be seen that the loss approaches a low limiting value which approximates the loss in pure copper at very low values of d, and increases toward a higher limiting value which approximates the loss in pure stainless steel at values of d above approximately 1.

At relatively low frequencies corresponding to values of d below approximately unity, a portion of the electromagnetic radiation passes through the material layer 24 and is reflected from the higher conductivity waveguide member 22, thereby experiencing relatively lower loss. At higher frequencies, very little of the radiation passes through the material layer 24, and most of the radiation is subjected to relatively high loss in the lower conductivity layer 24.

Figure 6:
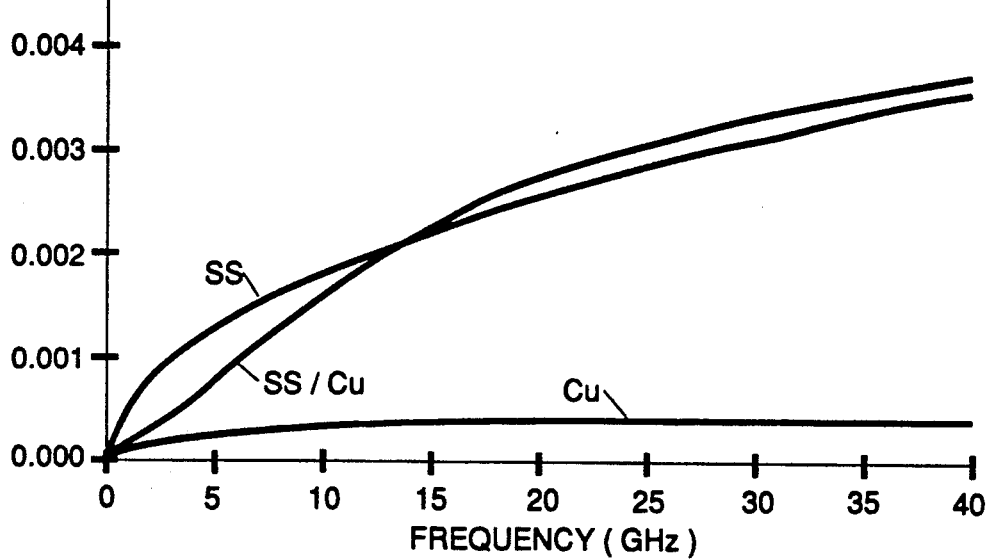
FIG. 6 is a graph which further illustrates operation of the low pass filter configuration.

The low pass filter configuration is further illustrated in FIG. 6. In this drawing, the horizontal axis represents frequency, whereas the vertical axis represents the absolute value of the loss (1−R). (The plot is normalized such that the numerical value of d corresponds to $$\sqrt{10GHz/f}$$

or unity at f=10 GHz). Curves are plotted for pure stainless steel, pure copper, and stainless steel on copper.

It will be seen that for the low pass filter configuration, the loss for stainless steel on copper is lower than the loss for pure stainless steel below a point 28 corresponding to a frequency of approximately 14 GHz at which the curves cross, and that the loss for stainless steel on copper actually exceeds that of pure stainless steel (due to resonance absorption in the material layer 24) at higher frequencies. Thus, this particular low pass filter configuration is effective for values of f less than approximately 14 GHz.

In summary, the low pass filter configuration of this example provides relatively low absorption or loss below a frequency at which the thickness a of the material layer 24 is approximately equal to or less than the skin depth $\delta_1$ of the material layer 24, and progressively increasing absorption or loss occurs as the frequency is increased.

Figure 7:
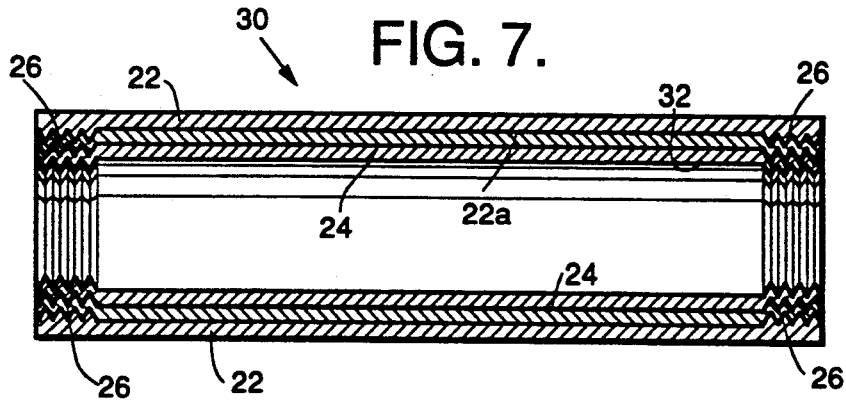
FIG. 7 is a longitudinal sectional view of a modified cavity resonator embodying the present invention.

FIG. 7 illustrates a modified cavity resonator 30 embodying the present invention, in which like elements are designated by the same reference numerals used in FIG. 3. The resonator 30 differs from the resonator 20 in that it includes an additional material layer 32 coated on the material layer 24. The resonator 30 may be configured to operate as a band pass filter or a band exclusion filter by selecting the relative conductivities of the waveguide member 22 and material layers 24 and 32.

Figure 8:
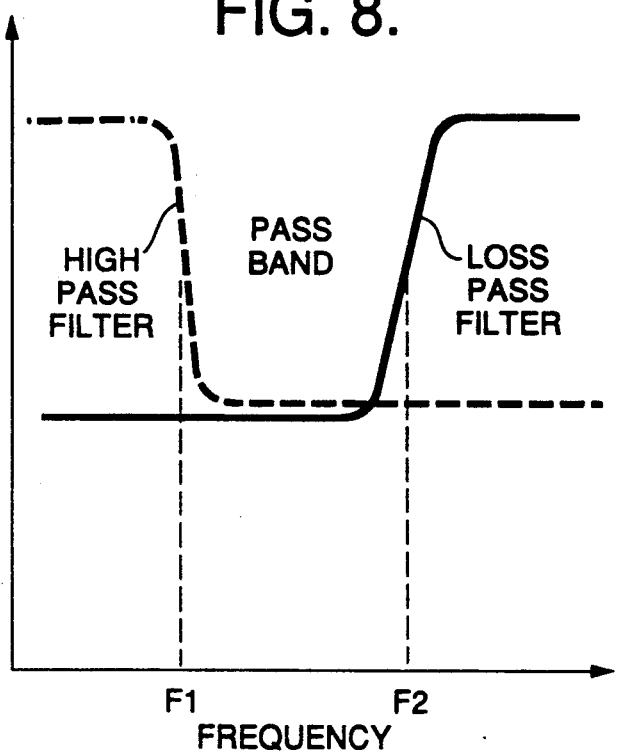
FIG. 8 is a graph illustrating the operation of the cavity resonator of FIG. 7 in a band pass filter configuration.

FIG. 8 illustrates the operation of the resonator 30 configured as a band pass filter, with the waveguide member 22 having relatively low conductivity, the material layer 24 having relatively high conductivity and the material layer 32 having relatively low conductivity. This configuration is equivalent to coating an additional low conductivity layer on a high pass filter. Another way to describe the band pass filter is a combination of a high pass filter with a cutoff frequency F1, and a low pass filter with a cutoff frequency F2 which is higher than F1, with the low loss regions of the filters overlapping.

At frequencies below F1, a relatively large portion of the electromagnetic radiation passes through the material layers 24 and 32 and is absorbed by the waveguide member 22 to produce relatively high loss. At frequencies between F1 and F2, a relatively large portion of the radiation passes through the material layer 32 and reflects from the material layer 24 to produce relatively low loss. At frequencies above F2, a relatively large portion of the radiation is absorbed by the material layer 32, producing relatively high loss. The low loss pass band therefore lies between F1 and F2.

Figure 9:
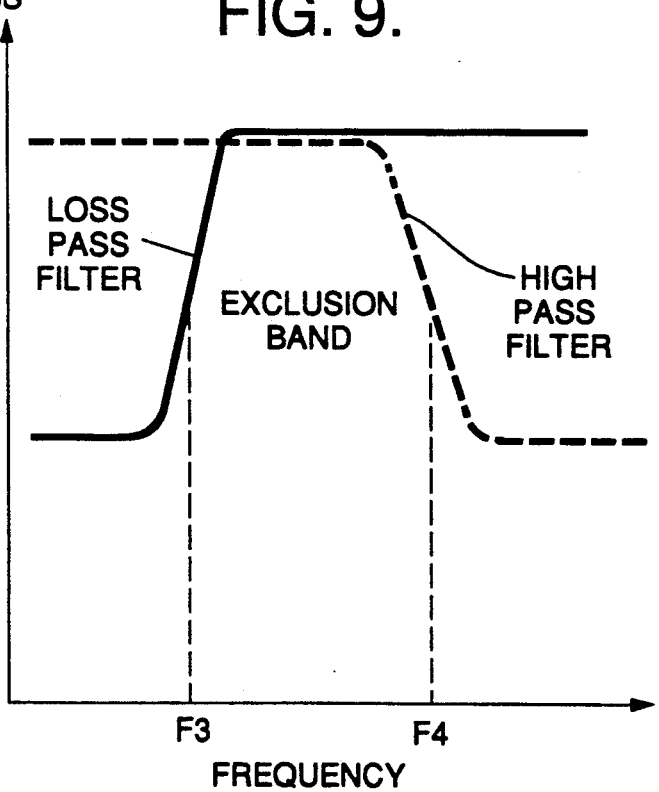
FIG. 9 is a graph illustrating the operation of the cavity resonator of FIG. 7 in a band exclusion filter configuration.

FIG. 9 illustrates the operation of the resonator 30 configured as a band exclusion filter, with the waveguide member 22 having relatively high conductivity, the material layer 24 having relatively low conductivity and the material layer 32 having relatively high conductivity This configuration is equivalent to coating an additional high conductivity layer on a low pass filter. Another way to describe the band exclusion filter is a combination of a low pass filter with a cutoff frequency F3, and a high pass filter with a cutoff frequency F4 which is higher than F3, with the high loss regions of the filters overlapping.

At frequencies below F3, a relatively large portion of the electromagnetic radiation passes through the material layers 24 and 32 and is reflected from the waveguide member 22. The reflected radiation propagates through the material layer 32 with relatively low loss. At frequencies between F3 and F4, a relatively large portion of the radiation passes through the material layer 32 and is absorbed by the material layer 24 to produce relatively high loss. At frequencies above F4, a relatively large portion of the radiation propagates through the material layer 32, producing relatively low loss. The high loss exclusion band therefore lies between F3 and F4.

It should be noted that all of the metallic layers will induce loss and the loss will vary with frequency. However, it is important for waveguides to consider the relative amount of loss at given frequencies as the structure of the waveguide is varied. Therefore, the basic principle of the present invention is to provide a waveguide member including at least two layers of materials having different electrical properties such that electromagnetic radiation in a first frequency range is absorbed relatively more than radiation in a second frequency range which is different from the first frequency range. The particular materials selected to embody the high pass, low pass, band pass or band exclusion configurations depend on the particular application. The low conductivity material may be a dielectric. It is further within the scope of the invention to coat or otherwise form more than two material layers on the inner peripheral surface 22a of the waveguide member 22 to provide multiple pass or exclusion bands.

The following examples 1–4 illustrate how materials and thicknesses may be selected in accordance with the principles of the invention.

EXAMPLE 1—HIGH PASS FILTER

A high pass filter configuration as illustrated in FIG. 4 includes a copper material layer 24 plated on the inner peripheral surface 22a of a stainless steel waveguide member 22. It is desired that the loss factor at a frequency of 10 GHz as plotted in FIG. 4 be equal to two. Applying equ (2), the skin depth $\delta$ in copper at 10 GHz is approximately $6.4 \times 10^{-5}$ cm. Applying equ (3) (see FIG. 4), the thickness a of the layer 24 for a loss factor of two is equal to approximately $0.4\delta$. Thus, the required thickness for the copper material layer 24 is $0.4 \times (6.4 \times 10^{-5} \text{ cm}) = 2.6 \times 10^{-5}$ cm

EXAMPLE 2—LOW PASS FILTER

A low pass filter configuration as illustrated in FIGS. 5 and 6 includes a stainless steel material layer 24 plated on the inner peripheral surface 22a of a copper waveguide member 22. It is desired that the relative loss below a frequency of 14 GHz as plotted in FIG. 6 be less than for pure stainless steel. This occurs when the thickness a of the material layer 24 is equal to the skin depth $\delta$ at 10 GHz. Applying equ (2), the skin depth $\delta$ in stainless steel at 10 GHz is approximately $4.3 \times 10^{-4}$ cm. This is the required thickness for the stainless material layer 24.

EXAMPLE 3—BAND PASS FILTER

An exemplary pass band of 7–14 GHz is desired. A high pass filter configuration includes a copper material layer 24 formed on a stainless steel waveguide member 22. A stainless steel material layer 32 is formed over the material layer 24 of the high pass filter.

As described above with reference to FIG. 6, one skin depth of stainless steel at 10 GHz produces decreased loss above 15 GHz. Thus, the thickness of the stainless steel material layer 32 is made equal to this value, or $4.3 \times 10^{-4}$ cm.

Making the copper material layer 24 one skin depth thick at 5 GHz causes increased loss due to fields penetrating this layer below 7 GHz. Applying equ (2), one skin depth of copper at 5 GHz is $9.0 \times 10^{-5}$ cm. Thus, the thickness of the copper material layer 24 is $9.0 \times 10^{-5}$ cm.

EXAMPLE 4—BAND EXCLUSION FILTER

An exemplary exclusion band of 7–14 GHz is desired. A low pass filter configuration includes a stainless material layer 24 formed on a copper waveguide member 22. A copper material layer 32 is formed over the material layer 24 of the low pass filter.

The thickness of the copper material layer 32 is one skin depth at 10 GHz = $6.4 \times 10^{-5}$ cm, whereas the thickness of the stainless steel material layer 24 is one skin depth at 5 GHz = $9.0 \times 10^{-4}$ cm. The copper material layer 32 provides an increased loss below 14 GHz as described above, whereas the stainless steel material layer 24 provides reduced loss below 7 GHz. Radiation below 2.6 GHz is reflected from the surface 22a of the waveguide member 22 and subsequently propagates through the material layer 32, thereby reducing its relative loss. This configuration thereby excludes the band between 7 and 14 Ghz.

EXAMPLE 5—EXPERIMENTAL RESULTS

A cavity resonator was fabricated as including a pure copper waveguide member with Bragg reflectors provided at its opposite ends as described in the above referenced patent to Harvey. The resonator was tested in a conventional FEL. The measured Q at 30 GHz was 10,000, and the measured Q at 10 GHz was 4,500.

A cavity resonator incorporating a high pass filter such as illustrated in FIG. 3 and described with reference to FIG. 4 was fabricated as including a stainless steel waveguide member with a material layer of copper coated on the inner peripheral surface thereof to a thickness of $2.5 \times 10^{-3}$ cm (estimated) with Bragg reflectors provided at the opposite ends. (The internal plating process is not precise so trial and error was used when plating). The measured Q at 30 GHz was 10,000, the same as for the pure copper cavity resonator. However, the measured Q at 10 GHz was 1,600. The loss for the undesired low frequency mode at 10 GHz was increased by a factor of approximately three in accordance with the present invention.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

We claim:

1. A cavity resonator, comprising:
   a hollow waveguide member having an inner peripheral surface and a first electrical conductivity;
   a first material layer formed on said surface having a second electrical conductivity which is different from the first conductivity;
   the first conductivity, second conductivity and the thickness of the first material layer being selected such that electromagnetic radiation in a first frequency range propagates through the resonator with relatively low absorption, and electromagnetic radiation in a second frequency range which is different from the first frequency range propagates through the resonator with relatively high absorption; and
   means for causing resonance of the electromagnetic radiation in the first frequency range in the waveguide member.

2. A resonator as in claim 1, in which the first conductivity is lower than the second conductivity such that the first frequency range is higher than the second frequency range.

3. A cavity resonator, comprising:
   a hollow waveguide member having an inner peripheral surface and a first electrical conductivity;

a first material layer formed on said surface having a second electrical conductivity which is different from the first conductivity;

the first conductivity and second conductivity being selected such that electromagnetic radiation in a first frequency range propagates through the resonator with relatively low absorption, and electromagnetic radiation in a second frequency range which is different from the first frequency range propagates through the resonator with relatively high absorption; and means for causing resonance of the electromagnetic radiation in the first frequency range in the waveguide member; in which the first conductivity is lower than the second conductivity such that the first frequency range is higher than the second frequency range; and the first material layer has a thickness in meters which is at least approximately $$\delta = 504/(f_L \sigma K_m)^{\frac{1}{2}}$$

where $f_L$ is the lowest frequency in the first frequency range, $\delta$ is the skin depth of the first material layer at the frequency $f$, $\sigma$ is the second conductivity and $K_m$ is the relative permeability of the first material layer.

4. A resonator as in claim 1, in which the first conductivity is higher than the second conductivity such that the first frequency range is lower than the second frequency range.

5. A cavity resonator, comprising:
a hollow waveguide member having an inner peripheral surface and a first electrical conductivity;
a first material layer formed on said surface having a second electrical conductivity which is different from the first conductivity;
the first conductivity and second conductivity being selected such that electromagnetic radiation in a first frequency range propagates through the resonator with relatively low absorption, and electromagnetic radiation in a second frequency range which is different from the first frequency range propagates through the resonator with relatively high absorption; and
means for causing resonance of the electromagnetic radiation in the first frequency range in the waveguide member; in which
the first conductivity is higher than the second conductivity such that the first frequency range is lower than the second frequency range; and
the first material layer has a thickness in meters which is no greater than approximately $$\delta = 504/(f_H \sigma K_m)^{\frac{1}{2}}$$

where $f_H$ is the higher frequency in the first frequency range, $\delta$ is the skin depth of the first material layer at the frequency $f_H$, $\sigma$ is the second conductivity and $K_m$ is the relative permeability of the first material layer.

6. A resonator as in claim 1, further comprising a second material layer formed on the first material layer and having a third electrical conductivity;
the first and third conductivities being lower than the second conductivity such that the first frequency range is higher than the second frequency range, and electromagnetic radiation in a third frequency range which is higher than the first frequency range propagates through the resonator with relatively high absorption.

7. A cavity resonator, comprising:
a hollow waveguide member having an inner peripheral surface and a first electrical conductivity;
a first material layer formed on said surface having a second electrical conductivity which is different from the first conductivity;
the first conductivity and second conductivity being selected such that electromagnetic radiation in a first frequency range propagates through the resonator with relatively low absorption, and electromagnetic radiation in a second frequency range which is different from the first frequency range propagates through the resonator with relatively high absorption;
means for causing resonance of the electromagnetic radiation in the first frequency range in the waveguide member; and
a second material layer formed on the first material layer and having a third electrical conductivity;
the first and third conductivities being lower than the second conductivity such that the first frequency range is higher than the second frequency range, and electromagnetic radiation in a third frequency range which is higher than the first frequency range propagates through the resonator with relatively high absorption; in which
the first material layer and the second material layer have thicknesses selected such that:
at least a portion of the electromagnetic radiation in the first frequency range propagates through the first material layer;
at least a portion of the electromagnetic radiation in the second frequency range passes through the second material layer and the first material layer and is absorbed by the waveguide member; and
at least a portion of the electromagnetic radiation in the third frequency range is absorbed by the second material layer.

8. A resonator as in claim 1, further comprising a second material layer formed on the first material layer and having a third electrical conductivity;
the first and third conductivities being higher than the second conductivity such that the first frequency range is lower than the second frequency range, and electromagnetic radiation in a third frequency range which is higher than the second frequency range propagates through the resonator with relatively low absorption.

9. A cavity resonator, comprising:
a hollow waveguide member having an inner peripheral surface and a first electrical conductivity;
a first material layer formed on said surface having a second electrical conductivity which is different from the first conductivity;
the first conductivity and second conductivity being selected such that electromagnetic radiation in a first frequency range propagates through the resonator with relatively low absorption, and electromagnetic radiation in a second frequency range which is different from the first frequency range propagates through the resonator with relatively high absorption;
means for causing resonance of the electromagnetic radiation in the first frequency range in the waveguide member; and a second material layer formed on the first material layer and having a third electrical conductivity;

the first and third conductivities being higher than the second conductivity such that the first frequency range is lower than the second frequency range, and electromagnetic radiation in a third frequency range which is higher than the second frequency range propagates through the resonator with relatively low absorption; in which the first material layer and the second material layer have thicknesses selected such that:

at least a portion of the electromagnetic radiation in the first frequency range passes through the first material layer and the second material layer, is reflected from said surface, and subsequently propagates through said second material layer;

at least a portion of the electromagnetic radiation in the second frequency range is absorbed by the first material layer; and at least a portion of the electromagnetic radiation in the third frequency range propagates through said second material layer.

10. A resonator as in claim 1, in which:

the waveguide member comprises stainless steel; and the first material layer comprises copper;

such that the first conductivity is lower than the second conductivity and the first frequency range is higher than the second frequency range.

11. A resonator as in claim 1, in which:

the waveguide member comprises copper; and the first material layer comprises stainless steel;

such that the first conductivity is higher than the second conductivity and the first frequency range is lower than the second frequency range.

12. A resonator as in claim 1, in which said surface is much smoother than 0.25 $c/f_H$, where c is the speed of light, and $f_H$ is the highest frequency of operation.

13. A waveguide filter, comprising:

a hollow waveguide member having an inner peripheral surface and a first electrical conductivity; and a first material layer formed on said surface having a second electrical conductivity which is different from the first conductivity;

the first conductivity, second conductivity and the thickness of the first material layer being selected such that electromagnetic radiation in a first frequency range propagates through the filter with relatively low absorption, and electromagnetic radiation in a second frequency range which is different from the first frequency range propagates through the filter with relatively high absorption.

14. A filter as in claim 13, in which the first conductivity is lower than the second conductivity such that the first frequency range is higher than the second frequency range.

15. A waveguide filter, comprising:

a hollow waveguide member having an inner peripheral surface and a first electrical conductivity; and a first material layer formed on said surface having a second electrical conductivity which is different from the first conductivity;

the first conductivity and second conductivity being selected such that electromagnetic radiation in a first frequency range propagates through the filter with relatively low absorption, and electromagnetic radiation in a second frequency range which is different from the first frequency range propagates through the filter with relatively high absorption; in which the first conductivity is lower than the second conductivity such that the first frequency range is higher than the second frequency range; and the first material layer has a thickness in meters which is at least approximately $$\delta = 504/(f_L \sigma K_m)^{\frac{1}{2}}$$

wherein $f_L$ is the lowest frequency in the first frequency range, $\delta$ is the skin depth of the first material layer at the frequency $f_L$, $\sigma$ is the second conductivity and $K_m$ is the relative permeability of the first material layer.

16. A filter as in claim 13, in which the first conductivity is higher than the second conductivity such that the first frequency range is lower than the second frequency range.

17. A waveguide filter, comprising:

a hollow waveguide member having an inner peripheral surface and a first electrical conductivity; and a first material layer formed on said surface having a second electrical conductivity which is different from the first conductivity;

the first conductivity and second conductivity being selected such that electromagnetic radiation in a first frequency range propagates through the filter with relatively low absorption, and electromagnetic radiation in a second frequency range which is different from the first frequency range propagates through the filter with relatively high absorption; in which the first conductivity is higher than the second conductivity such that the first frequency range is lower than the second frequency range; and the first material layer has a thickness in meters which is no larger than approximately $$\delta = 504/(f_H \sigma K_m)^{\frac{1}{2}}$$

wherein $f_H$ is the highest frequency in the first frequency range, $\delta$ is the skin depth of the first material layer at the frequency $f_H$, $\sigma$ is the second conductivity and $K_m$ is the relative permeability of the first material layer.

18. A filter as in claim 13, further comprising a second material layer formed on the first material layer and having a third electrical conductivity;

the first and third conductivities being lower than the second conductivity such that the first frequency range is higher than the second frequency range, and electromagnetic radiation in a third frequency range which is higher than the first frequency range propagates through the filter with relatively high absorption.

19. A waveguide filter, comprising:

a hollow waveguide member having an inner peripheral surface and a first electrical conductivity; and a first material layer formed on said surface having a second electrical conductivity which is different from the first conductivity;

the first conductivity and second conductivity being selected such that electromagnetic radiation in a first frequency range propagates through the filter with relatively low absorption, and electromagnetic radiation in a second frequency range which is different from the first frequency range propagates through the filter with relatively high absorption; and a second material layer formed on the first material layer and having a third electrical conductivity;

the first and third conductivities being lower than the second conductivity such that the first frequency range is higher than the second frequency range, and electromagnetic radiation in a third frequency range which is higher than the first frequency range propagates through the filter with relatively high absorption; in which the first material layer and the second material layer have thicknesses selected such that:

at least a portion of the electromagnetic radiation in the first frequency range propagates through the first material layer;

at least a portion of the electromagnetic radiation in the second frequency range passes through the second material layer and the first material layer and is absorbed by the waveguide member; and at least a portion of the electromagnetic radiation in the third frequency range is absorbed by the second material layer.

20. A filter as in claim 13, further comprising a second material layer formed on the first material layer and having a third electrical conductivity;

the first and third conductivities being higher than the second conductivity such that the first frequency range is lower than the second frequency range, and electromagnetic radiation in a third frequency range which is higher than the second frequency range propagates through the filter with relatively low absorption.

21. A waveguide filter, comprising:

a hollow waveguide member having an inner peripheral surface and a first electrical conductivity; and a first material layer formed on said surface having a second electrical conductivity which is different from the first conductivity;

the first conductivity and second conductivity being selected such that electromagnetic radiation in a first frequency range propagates through the filter with relatively low absorption, and electromagnetic radiation in a second frequency range which is different from the first frequency range propagates through the filter with relatively high absorption; and a second material layer formed on the first material layer and having a third electrical conductivity;

the first and third conductivities being higher than the second conductivity such that the first frequency range is lower than the second frequency range, and electromagnetic radiation in a third frequency range which is higher than the second frequency range propagates through the filter with relatively low absorption; in which the first material layer and the second material layer have thicknesses selected such that:

at least a portion of the electromagnetic radiation in the first frequency range passes through the first material layer and the second material layer, is reflected from said surface, and subsequently propagates through said second material layer;

at least a portion of the electromagnetic radiation in the second frequency range is absorbed by the first material layer; and at least a portion of the electromagnetic radiation in the third frequency range propagates through said second material layer.

22. A filter as in claim 13, in which:

the waveguide member comprises stainless steel; and the first material layer comprises copper;

such that the first conductivity is lower than the second conductivity and the first frequency range is higher than the second frequency range.

23. A filter as in claim 13, in which:

the waveguide member comprises copper; and the first material layer comprises stainless steel;

such that the first conductivity is higher than the second conductivity and the first frequency range is lower than the second frequency range.

24. A filter as in claim 13, in which said surface is much smoother than $0.25c/f_H$, where c is the speed of light and $f_H$ is the highest frequency of operation.

* * * * *